Oct. 14, 1958
C. E. MILLER
2,856,193
CHUCKING MECHANISM
Filed Oct. 6, 1954
2 Sheets-Sheet 1
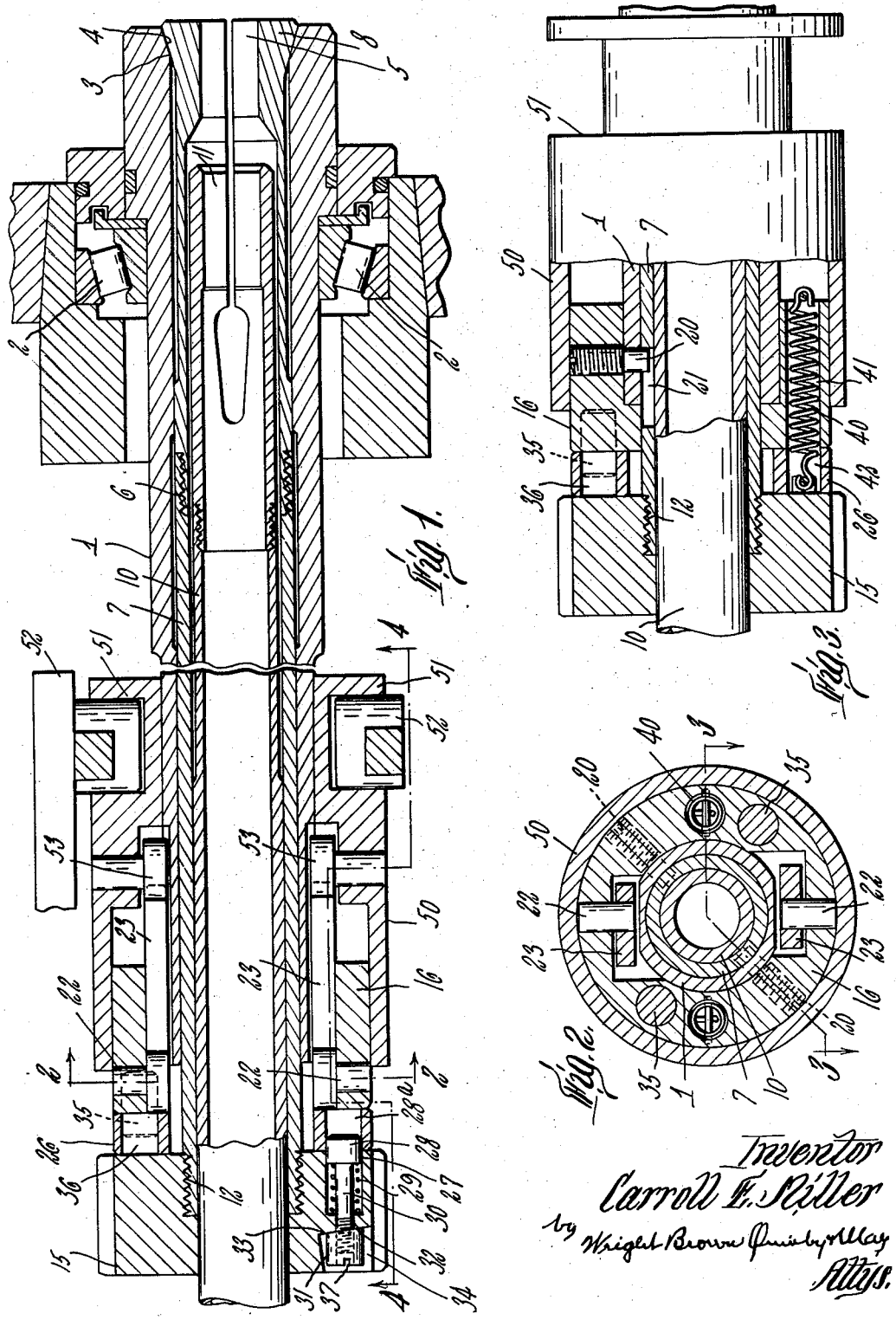

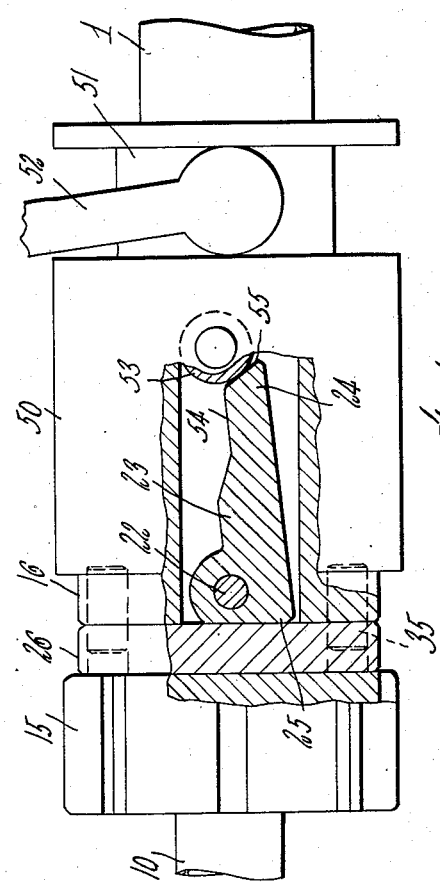
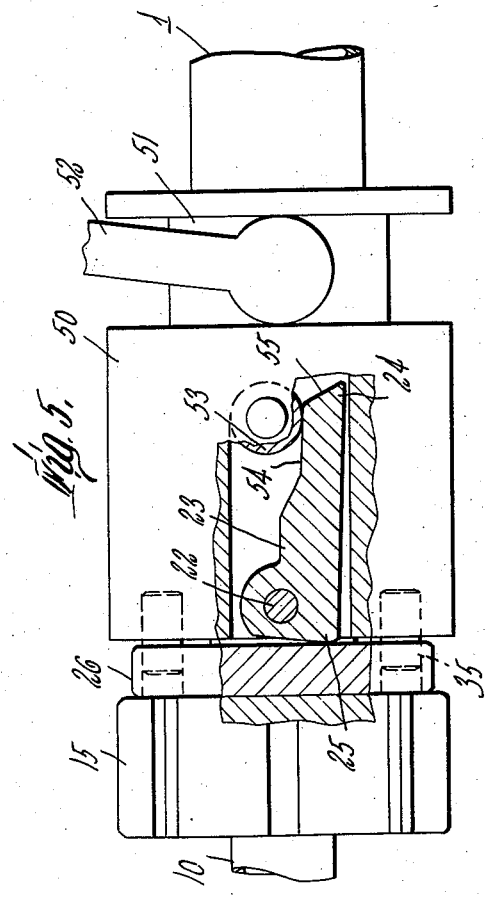

United States Patent Office 2,856,193
Patented Oct. 14, 1958

2,856,193

CHUCKING MECHANISM

Carroll E. Miller, Windsor, Vt., assignor to Cone Automatic Machine Company Inc., Windsor, Vt., a corporation of Vermont Application October 6, 1954, Serial No. 460,605

5 Claims. (Cl. 279—51)

This invention relates to chucking mechanism and more especially to such mechanism of the collet type, and has for an object to provide such a mechanism which will be substantially unaffected by centrifugal force produced by rotation of the work holding spindle to which it is applied.

To this end the chucking fingers which control the closing and opening of the chuck are arranged to pivot about axes perpendicular to the axis of rotation of the spindle.

A further object is to provide improved means for adjusting the chucking mechanism to properly grip and release the work.

For a complete understanding of this invention, reference may be had to the accompanying drawings in which Figure 1 is a fragmentary central longitudinal cross sectional view through a rotary work spindle embodying the invention, the collet being shown in open condition.

Figure 2 is a detail sectional view on line 2—2 of Figure 1.

Figure 3 is a detail sectional view on line 3—3 of Figure 2.

Figure 4 is a detail sectional view on line 4—4 of Figure 1.

Figure 5 is a view similar to Figure 4, but showing the parts in collet-closed condition.

Referring first to Figures 1, 2 and 3, at 1 is shown a rotary work-carrying spindle journaled for rotation, one of such journals comprising, as shown, the roller bearings at 2. The forward end of this spindle is provided with an internally tapered face 3 with which engages the externally tapered face 4 of a collet 5. The rear end of this collet 5 has secured thereto as by threads at 6, a collet-actuating sleeve 7 which is movable axially within the spindle, movement to the left causing the faces 3 and 4 to slide in a direction to bring the collet jaws 8 inwardly and grip the work piece, which extends therethrough in the well known manner, and movement to the right to permit the collet jaws to release the work piece.

Inwardly of the sleeve 7 and collet 5, is shown the usual stock feeding sleeve 10 with its work-gripping jaws 11.

The rear end of the collet sleeve 7 has secured thereto as by threads at 12, a part 15 of a two-part cylindrical head, and the spindle 1 is provided with a head 16 spaced from the collet sleeve head 5. The head 16 is secured to the spindle 1 as by the screws 20 shown in Figure 2, and the inner reduced diameter ends of these screws engage in slots 21 extending longitudinally within the collet sleeve 7, thus keying these parts against relative rotation, but allowing relative axial motion.

The head 16 is provided with radial pivot pins 22 on which are pivoted chucking fingers 23. As shown best in Figures 4 and 5, these fingers 23 are provided with extensions 24 projecting toward the forward end of the spindle and they also have cam portions 25. These cam portions 25 can engage against a collar 26 forming the other part of the collet head and positioned between the parts 15 and 16 and normally latched against rotation relative to the part 15 by spring pressed plugs 27, the heads 28 of which may engage in mating holes 28a through the collar 26. Springs 29 surrounding the reduced diameter portions 30 of these plugs 27, and bearing against the rear faces of their heads 28, tend to hold the plugs in engaging position. Nuts 31 threaded on the rear ends of the plugs 27 and having forward faces 32 inclined to the perpendicular to the axis of the spindle and engaging matingly inclined faces 33 in the bases of recesses 34 in the head 15 tend to retain the plugs in their positions and to hold the nuts 31 against accidental turning. The collar 26 is held against rotation relative to the head 16 as by means of plugs 35 secured in the head 16 and engaging in holes 36 in the collar, and the collar 26 is normally held against the rear end of the head 16 as by coil springs 40 which are seated in perforations 41 and 42 through the head 16 and the collar 26, as shown best in Figure 3. The collet head 15—26 is thus normally held against rotation relative to the spindle 1, thus fixing the axial position of the collet 8 corresponding to any axial position of the collar member 15. This relation, however, may be adjusted by pulling the plugs 27 out of the holes 28a and screwing or unscrewing the head element 15 on the collet sleeve 7. To facilitate this, the nuts 31 are shown as provided with screw driver slots 37 at their outer ends. By inserting a screw driver in such slots, the nuts may be rotated 180°, causing engagement between the mating inclined faces at 32 to produce retraction of the plugs 27. The element 15 may then be rotated in either direction sufficiently for the plugs 27 to again line up with holes 28a.

Slidable axially on the spindle is an actuating collar 50 which may be provided with a spool shaped portion 51 between the sides of which may engage an actuating lever 52. The head 16 has journaled therein a pair of cam rolls 53, each of which rides on a cam face 54 of one of the fingers 23. When the collar 50 is moved to the right from the position in Figure 5 to that of Figure 4, each cam roller 53 engages the end portion 55 of a cam surface 54, removing the cam portion 25 from wedging engagement against the collar 15—26, in which position the collet sleeve is allowed to move to the right and free the collet from gripping engagement with the work piece. When the collar 50 is moved in the opposite direction, the cam rollers 53 ride up onto the cam surfaces 54 back of the portions 55, wedging the fingers into the position shown in Figure 5, where the cam portion 25 engages the collar 26 and pulls back on the collet tube, causing the collet to close down upon the work piece.

From the foregoing description of the embodiment of this invention, it should be evident to those skilled in the art that various changes and modifications may be made therein without departing from its spirit or scope.

I claim:

1. In combination, a spindle, work-gripping means including a collet carried by said spindle, a collet sleeve connected to said collet and axially movable to cause said collet to grip or release work, a plurality of fingers carried by said spindle and extending parallel to the spindle axis, said fingers being mounted outside of said sleeve for swinging motion about axes substantially radial to the longitudinal axis of said spindle and operatively related to said sleeve and spindle to move said sleeve axially to grip or release the work on swinging of said fingers, and means movably carried by said spindle for swinging said fingers.

2. In combination, a spindle having an internally tapered face portion, a collet having an external face mating said spindle face, a sleeve secured to said collet, a head secured to said spindle, a head comprising an element threaded on said sleeve and a collar between said element and spindle head, means normally keying said sleeve head element to said collar, means engaging said collar and spindle head for preventing relative rotation therebetween, said spindle head having an internal recess, a finger journaled in said recess to swing about a substantially radial axis transverse to the axis of said spindle and having a cam portion extending longitudinally to said axis and a shoulder engageable with said collar, a spool slidable longitudinally of said spindle and having a follower engaging said cam, and means for moving said spool longitudinally of said spindle.

3. In combination, a spindle having an internally tapered face portion, a collet having an external face mating said spindle face, a sleeve secured to said collet, a head secured to said spindle, a head comprising an element threaded on said sleeve and a collar between said element and spindle head, latch means normally keying said sleeve head element to said collar, means engaging said collar and spindle head for preventing relative rotation therebetween, said spindle head having an internal recess, a finger journaled in said recess to swing about a substantially radial axis transverse to the axis of said spindle and having a cam portion extending longitudinally to said axis and a shoulder engageable with said collar, a spool slidable longitudinally of said spindle and having a follower engaging said cam, means for moving said spool longitudinally of said spindle, and means operable to release said latch means to permit adjustment of said sleeve head relative to said sleeve.

4. In combination a spindle having an internally tapered face, a collet having an external face mating said spindle face, a sleeve secured to said collet, a head secured to said spindle, a head comprising an element threaded on said sleeve and a collar between said element and spindle head, latch means normally keying said sleeve head element to said collar, said latch means including a member having a face inclined to the perpendicular to the axis of said spindle and a mating inclined face on said head element with which said member face normally engages, said member having tool engageable means for turning said member relative to said head element to cause said faces to turn relatively and force said latch means to unlatching position wherein said head element may be turned at its threaded connection to said sleeve to relatively adjust said head element lengthwise of said sleeve, and means carried by one of said heads and engaging the other head operable to force said heads apart to cause said collet to grip a work piece therein or to permit said heads to approach each other to release such work piece.

5. In combination, a spindle, a work-gripping means including a collet carried by said spindle, a collet sleeve connected to said collet and axially movable to cause said collet to grip or release work, a plurality of fingers carried by said spindle and extending parallel to the axis thereof, said fingers being mounted outside of said sleeve to rock about axes perpendicular to the spindle axis, a collar slidable axially on said spindle, and cam rollers carried by said collar on axes perpendicular to the spindle axis operatively engaging side edges of said fingers.

References Cited in the file of this patent

UNITED STATES PATENTS

| | | |
|---|---|---|
| 594,077 | Gauthier | Nov. 23, 1897 |
| 778,955 | Dunlevy | Jan. 3, 1905 |
| 1,834,157 | Impey | Dec. 1, 1931 |
| 2,454,098 | Schmidt | Nov. 16, 1948 |